3,258,396
RODENTICIDAL BAIT COMPOSITIONS
John L. Schaar, Ashland, Ohio, assignor to Richardson-Merrell Inc., New York, N.Y., a corporation of Delaware
No Drawing. Filed Oct. 22, 1964, Ser. No. 405,842
3 Claims. (Cl. 167—48)

This invention relates to rodenticidal compositions and in particular rodenticidal compositions of special value for destroying mice and rats. The compositions comprise kibbled corn in combination with a rodenticidal agent.

Every year millions of dollars' worth of grains and other foodstuff are damaged or destroyed by rats, mice and other rodents. Man is continually waging what sometimes appears to be a losing battle against such losses. For many years much research has been conducted relative to improved rodenticidal agents and baits both as to composition, size, and shape best suited for destroying vermin. Rodent baits have taken many forms and include a wide variety of compositions. The acceptance by rodents of various bait compositions having a rodenticide incorporated therein is highly selective. It is, of course, advantageous to employ a bait for which the rodents have a preference.

It has now been found that kibbled corn, particularly of a certain particle size, containing a rodenticide is a highly preferred composition for rodents. Tests show that rats prefer such a composition over others including other forms of corn, other cereals, combinations of cereals with cheese, etc., and those which contain kibbled corn together with soya, or the hydrolyzed corn product of kibbled corn in some other physical form, e.g., hard non-absorbent extruded pellets, flakes and even kibbled corn of different particle sizes from that used in this invention. The preferred particle size of kibbled corn for use in this invention are those particles which pass through a 2.5 mesh screen (standard series) but are retained on a 6 mesh screen.

Kibbled corn is a well-known product used extensively as a component of dog foods. A definition of kibbled corn can be found on page 35 of "The Feed Bag Red Book, Buyer's Guide" for 1964. It is there defined as "the product obtained by cooking cracked corn under stream pressure and extruding from an expeller or other mechanical pressure device." This product can be obtained from a number of commercial sources. One such source for kibbled corn of the preferred particle size is that manufactured by the Ward Feed Company, Commerce Building, P.O. Box 632, Glen Ellen, Illinois, and sold as Ward's Kibbled Corn, Size A, coarse. This is a light tan colored, processed whole kernel corn of chunk-size consistency having a characteristic nut-like flavor and aroma. An analysis (percent by weight) of one commercial lot was as follows: ash, 1.30%; moisture (100° C. for 24 hours), 7.68%; fat, 1.93%; protein, 8.92%; fiber, 1.55%; and nitrogen free extract, 72.00% (minimum). Eighty-five percent of this commercial product was larger than 8 mesh standard screen size with a major portion being between 2.5 mesh (0.31 inch) to 6 mesh (0.132 inch). This material is porous, friable, and very absorbent. It can absorb water, as much as its own weight, without becoming plastic. Its bulk density was about 23.5 pounds per cubic foot. The above physical and chemical properties of kibbled corn, of the preferred size, are fairly standard in the industry and the bait of this invention is adequately defined for those skilled in the art by the term "kibbled corn." Of course, it will be reocognized that the physical and chemical properties of kibbled corn will differ from the exact specifications given above, e.g., such differences in physical and chemical properties can be from 10% to 20% or more depending on the exact composition of the corn employed as the raw metal, processing etc. Of course, various additives which do not distract from the palatability of this material can also be incorporated in the kibbled corn or the rodenticidal composition, i.e., kibbled corn plus rodenticide.

The preparation of kibbled corn is well known in the art. Briefly, in a preferred process its preparation is as follows. No. 2 yellow corn is used. The corn is cracked, moisture is added and the cracked corn cooked under heat and pressure to convert the cracked corn to an almost liquid state whereby the starch is hydrolyzed. During processing, this material is agitated slowly. When this material, i.e., the treated corn, is released or expelled from under pressure, it expands and solidifies to several times its original state or density. There is little or no raw starch in the finished product. The raw starch is converted by the above procedure to dextrose and other sugars and the product is crunchy.

The compositions of this invention are not limited to any particular rodenticidal agent. Thus, any well known poisons or chemical rodenticidal agents such as the following can be incorporated in the kibbled corn: N-monoaryl thioureas, e.g., N-(1-naphthyl)thiourea, or N-(2-naphthyl)thiourea; various phosphate esters, e.g., hexaethyltetrapolyphosphate; arsenic trioxide; strychnine sulfate; sodium monofluoroacetate; red squill; zinc phosphide; phosphorous (yellow); thallium sulfate; various rodenticides, particularly for rats which affect the animal's nervous system; and various anticoagulants such as 3-($\alpha$-acetonylbenzyl)-4-hydroxycoumarin, coumachlor, 3-($\alpha$-acetonyl-furfuryl)-4-hydroxycoumarin, 2-pivalyl-1,3-indandione; 3,3-methylene-bis(4-hydroxycoumarin); and the like.

The quantity of rodenticidal agent in the compositions of this invention can vary over a wide range depending on the particular agent employed and other obvious considerations. Illustratively, the quantity of rodenticidal agent in the entire rodenticidal composition can vary from about .005% to about 3% by weight thereof and particularly from about 0.015% to about 1.5% by weight thereof. In the use of the anticoagulant rodentical agents, it is particularly preferred to incorporate from about 0.02% to about 0.04% of rodenticide, by weight of the entire rodenticidal composition.

The rodenticide can be incorporated in the kibbled corn by various means. Preferably, the rodenticide is impregnated in the kibbled corn by first forming a solution of the rodenticide in a solvent, and then contacting the kibbled corn with the rodenticidal solution, e.g., by spraying the solution on to the kibbled corn. The solvent can be water or an organic solvent such as carbon tetrachloride, ethanol, etc., depending on the solubility of the rodenticide. Water is a preferred solvent and the rodenticide can often be converted to water soluble form, e.g., a salt such as the sodium salt, an acid addition salt, etc. The kibbled corn can be impregnated, or even coated with a suspension, emulsion or solution of the rodenticide. The rodenticide, however, can be incorporated in kibbled corn by other means. Illustratively, a rodenticide resistant to the hydrolysis treatment of the corn can be added to the cracked corn prior to processing or during some stage of the processing.

The addition of the rodenticide to the kibbled corn has little effect on the physical properties of the kibbled corn except, of course, for the addition of rodenticide, and its carrier, e.g., solvent, if a carrier is employed. Quantities of solvent, e.g., water as high as 5 or 10% by weight in addition to the moisture in kibbled corn does not deleteriously affect the kibbled corn. However, even larger quantities of the carrier, e.g., solvent can be employed and, if desired, the treated kibbled corn containing the rodenticide can be heated to drive off all or a part of the added solvent. Impregnation of the kibbled corn with a rodenticide in a liquid carrier generally reduces the fines content of the kibbled corn. This also gives a somewhat larger particle size and some of the particles of the rodenticidal composition can be as large as half an inch. In a preferred composition the kibbled corn treated with the rodenticide will generally contain some of the solvent, e.g., water, such as from about 1 to 10% by weight of the kibbled corn prior to the incorporation of the rodenticide. After extrusion or expelling of the dextronized corn from under steam pressure, it is cut or broken up to the desired particle size.

The following examples are illustrative of the invention.

EXAMPLE 1

Eight-hundred pounds of kibbled corn, size A, from the Ward Manufacturing Company were placed in a ribbon mixer. An aqueous solution of sodium warfarin was prepared by dissolving 107.16 grams of sodium warfarin [3-(α-acetonylbenzyl)-4-hydroxycoumarin, sodium salt] in 56.0 pounds of deionized water. Twenty-five milliliters of a 30% by weight aqueous solution of sodium hydroxide was added to the warfarin solution to ensure solution stability. The warfarin solution was then sprayed on to the kibbled corn over a period of about 15 minutes. Mixing was continued for two minutes after all the warfarin solution was added. The kibbled corn rodenticide of this example contained about 0.025% of sodium warfarin and had a total moisture content of about 10%. For the most part its screen mesh particle size was that of from about 8 mesh to about 2.5 mesh.

EXAMPLE 2

The following Table I shows the daily feed consumption by rats of a rodenticide of the instant invention containing 0.025% sodium warfarin as compared to two other rodenticidal compositions. It can be seen from the attached Table I that of the total quantity of rodenticidal compositions consumed during this experiment, the males ate 69.8% of the warfarin treated kibbled corn, 8.0% of Composition A (which is a commercially available rodenticidal composition containing 0.025% warfarin and a corn cereal bait) and 22.2% of Composition B (a commercially available rodenticidal composition containing 0.025% pivalyl [1] in a cereal base bait). Thus, kibbled corn plus warfarin was about three times better accepted than Composition B and about eight times better accepted than Composition A. Females ate 68.5% kibbled corn, 22.9% of Composition B and 8.6% of Composition A. The resulting ratios for the females are similar to those for males. All of the deaths in this experiment were due to internal hemorrhage. The materials and method used for this experiment were as follows:

(1) *Materials and methods*

(a) *Animals.*—Young rats of both sexes were used. The males selected for use ranged in weight from 285 to 304 grams and the females from 192 to 210 grams. The average weight of the males was 291.4 grams and of the females 200.6 grams.

(b) *Treatments.*—Plain kibbled corn, size A (about 2.5 to 6 mesh) was used as it came from the manufacturer (Ward Feed Co.). An aqueous solution of sodium warfarin (sodium salt of 3-(α-acetonylbenzyl)-4-hydroxycoumarin) was sprayed on to the kibbled corn. An analysis showed the resulting composition contained 0.025% warfarin. In preparing the composition, 484 pounds of kibbled corn was sprayed with a solution of 60.0 grams of sodium warfarin dissolved in 16 pounds of water.

(c) *Equipment used.*—The cages used in these trials were 24" x 36" galvanized metal cages with expanded metal floors. The feeders were standard feeding crocks with a capacity for approximately 500 grams.

(d) *Test procedure.*—In the comparison between kibbled corn plus sodium warfarin, Composition A, and Composition B, ten males and ten females were placed in two separate cages. Two hundred grams of each of the three rodenticidal compositions were offered ad libitum simultaneously in three separate feeders each day. The quantity unused after each 24 hour period was weighed, this weight recorded and the feed disposed of. Feeders were rotated daily to offset location preference. As each rat died, it was necropsied to ascertain the most probable cause of its death.

[1] Pivalyl is 2-pivalyl-1,3-indandione.

TABLE I.—THE FEED CONSUMPTION PLUS THE MEAN SURVIVAL TIME OF MALE AND FEMALE RATS FED THREE RODENTICIDES SIMULTANEOUSLY BUT IN SEPARATE CONTAINERS

| Mean Weight (Gms.) | Test Day | Kibbled corn containing 0.025 percent (%) sodium warfarin (Gms.) | Composition A (Gms.) | Composition B (Gms.) | Mean survival Time (days) | Percent (%) Mortalities |
|---|---|---|---|---|---|---|
| Males, 291.4 | 1 | 184 | 29 | 99 | | |
|  | 2 | 190 | 36 | 44 | | |
|  | 3 | 180 | 13 | 43 | | |
|  | 4 | 105 | 0 | 21 | | |
|  | 5 | 18 | 0 | 8 | | 20 |
|  | 6 | 2 | 0 | 1 | | 40 |
|  | 7 | 0 | 0 | 0 | | 20 |
|  | 8 | 0 | 0 | 0 | | 20 |
|  | | | | | 5 | |
| Totals | | 679 gms. | 78 gms. | 216 Gms. | | 100% |
| Percent Consumption | | 69.8% | 8% | 22.2% | | |
| Females, 200.6 | 1 | 152 | 33 | 56 | | |
|  | 2 | 145 | 12 | 46 | | |
|  | 3 | 141 | 17 | 24 | | |
|  | 4 | 50 | 0 | 37 | | |
|  | 5 | 4 | 0 | 2 | | 30 |
|  | 6 | 0 | 0 | 0 | | 20 |
|  | 7 | 0 | 0 | 0 | | 50 |
|  | | | | | 5 | |
| Totals | | 492 Gms. | 62 Gms. | 165 Gms. | | 100% |
| Percent Consumption | | 68.5% | 8.6% | 22.9% | | |

EXAMPLE 3

The following rodenticidal compositions further illustrate the invention. In all instances the kibbled corn was of a particle size of from about 2.5 to 6 mesh.

(a)

| | Parts by weight |
|---|---|
| Kibbled corn | 98 |
| 4-aminopteroylglutamic acid | 2 |

(b)

| | |
|---|---|
| Kibbled corn | 99.5 |
| Hexaethyltetrapolyphosphate | 0.5 |

(c)

| | |
|---|---|
| Kibbled corn | 99 |
| N-(1-naphthyl)thiourea | 1 |

What is claimed is:

1. A rodenticidal composition consisting essentially of a cereal grain bait containing a rodenticidally effective quantity of a rodenticide, said bait being friable, absorbent and in particulate form with a screen mesh size of from about 2.5 to 6 mesh and being the product obtained by (a) hydrolyzing cracked yellow corn under steam pressure to form a liquified and dextronized mass of the starch; (b) expanding and solidifying the liquified mass by removing it from the action of pressurized steam; and (c) finally subdividing the solidified mass to a particle size of from about 2.5 mesh to 6 mesh.

2. A composition of claim 1 wherein from about 0.015% to about 1.5% of rodenticide by weight is impregnated in said composition.

3. A composition of claim 1 wherein the rodenticide is a water soluble salt of warfarin in a quantity of from about 0.02% to about 0.04% by weight of said composition.

References Cited by the Examiner

UNITED STATES PATENTS 2,687,365   8/1954   Link _____ 167—48

OTHER REFERENCES

Webster's New International Dictionary (1961), p. 1240.

JULIAN S. LEVITT, *Primary Examiner.*

SAM ROSEN, *Examiner.*

S. J. FRIEDMAN, *Assistant Examiner.*